United States Patent [19]

Takeshita

[11] 3,900,379

[45] Aug. 19, 1975

[54] HYDROXYL-TERMINATED CHLOROPRENE POLYMERS

[75] Inventor: Tsuneichi Takeshita, Newark, Del.

[73] Assignee: E. I. Du Pont de Nemours and Company, Wilmington, Del.

[22] Filed: Apr. 2, 1974

[21] Appl. No.: 457,387

[52] U.S. Cl. .................. 204/159.24; 204/159.15; 204/159.18; 260/77.5 CR; 260/77.5 AP; 260/79; 260/92.3; 260/455 B
[51] Int. Cl. .............................. C08f 1/18
[58] Field of Search ....... 260/79, 77.5 CR, 77.5 AP, 260/92.3; 204/159.24

[56] References Cited
UNITED STATES PATENTS

| | | |
|---|---|---|
| 3,047,544 | 7/1962 | Byrd .................................. 260/79 |
| 3,580,830 | 5/1971 | Siebert ............................... 260/79 |
| 3,619,226 | 11/1971 | Hargreaves et al. ................. 260/79 |

*Primary Examiner*—Melvyn I. Marquis

[57] ABSTRACT

Substantially linear chloroprene polymers terminated by hydroxyalkyl xanthate or hydroxycycloalkyl xanthate groups are obtained by photopolymerizing chloroprene, optionally in admixture with other comonomers, in the presence of xanthogen disulfides terminated by hydroxyalkoxy or hydroxycycloalkoxy groups. These xanthogen disulfides are made by reaction of carbon disulfide with suitable diols, followed by oxidation of the resulting xanthates. The chloroprene polymers of the present invention can be chain-extended by reaction with polyisocyanates to solid, rubbery materials and also can be used to make polyurethane foams.

7 Claims, No Drawings

HYDROXYL-TERMINATED CHLOROPRENE POLYMERS

BACKGROUND OF THE INVENTION

This invention relates to a substantially linear chloroprene polymer which is terminated by hydroxyalkyl xanthate or hydroxycycloalkyl xanthate groups.

Chloroprene polymers terminated by functional groups are known. Thus, for example, U.S. Pat. No. 2,877,212 teaches the polymerization of chloroprene in the presence of an aliphatic azodicarboxylate in which the carbons attached to the azo group are tertiary. This azo compound is a polymerization initiator, which uner the polymerization conditions forms free radicals. The resulting polymer thus is terminated by carboxylate groups attached to the polymer chain through a tertiary carbon atom. These carboxylate groups can be reduced to hydroxyl groups. The patent further discloses that in the presence of hydrogen peroxide chloroprene polymerizes to a hydroxyl-terminated product. However, the efficiency of this reaction, i.e., the resulting functionality of chloroprene polymer is not discussed, and the polymer requires extensive washing to remove impurities.

U.S. Pat. No. 3,580,830 discloses the preparation of xanthate-terminated polymers, wherein the xanthate termination is essentially complete, that is, a xanthate group is present at each end of the polymer chain. While many monomers are said to undergo this reaction, chloroprene is not specifically mentioned. However, polymerization of chloroprene in the presence of dialkyl xanthogen disulfides, which serve as chain transfer agents, also is known. The xanthate groups are not further reactive and normally would have to be converted to reactive groups, such as mercaptan, to make possible a further chain extension. Normally some functionality is lost during these conversion reactions.

Chloroprene polymers, especially liquid polymers, bearing a reactive functional group at each end of the molecule, that would be cured with a polyfunctional vulcanizing agent at room temperature and could be obtained directly as the product of an economical one-step polymerization process would be very desirable in the preparation of caulks and adhesives.

SUMMARY OF THE INVENTION

According to the present invention, there is now provided a substantially linear chloroprene polymer, which is terminated at each end of the chain by a xanthate group represented by the following formula (1):

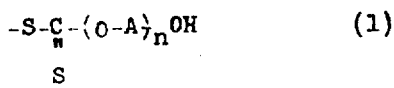

wherein A is an alkanediyl or cycloalkanediyl radical having at least two carbon atoms, and $n$ is a positive integer of at least 1. The two valences of A must not be attached to the same carbon atom or to two tertiary carbon atoms.

The polymers of this invention are made by a direct process, which does not require additional steps to provide the desired terminal functionality.

DETAILED DESCRIPTION OF THE INVENTION

Suitable divalent alkyl and cycloalkyl radicals, A, in Formula (1) include 1,2-ethanediyl (or ethylene), 1,2-propanediyl (or 1,2-propylene, etc.), 1,3-propanediyl, 1,4-butanediyl, 1,3-butanediyl, 1,6-hexanediyl, 2,5-hexanediyl, 1,2-dodecanediyl, and 1,4-cyclohexanediyl. When $n$ is 1, the preferred divalent radical A is 1,4-butanediyl or 1,6-hexanediyl. It is not considered economically attractive to allow the radical A to have more than twelve carbon atoms. When n is larger than 1, it is preferred to maintain the size of A within the range of 2–4 carbon atoms.

Although there is no theoretical ground to limit the value of $n$, it is not practical to exceed the value of 4 because of added cost, which is not justified by any possible improvement in the properties of the material.

The polymers of the present invention are prepared by a photoinitiated polymerization, using an ultraviolet light source, substantially in agreement with the process of the above-mentioned U.S. Pat. No. 3,580,830. The specific polymerization conditions are especially described in Column 3, line 23 to column 4, line 15 of said patent. However, instead of conventional dialkyl xanthogen disulfides, the xanthogen disulfides used in the process of the present invention have the following formula (2):

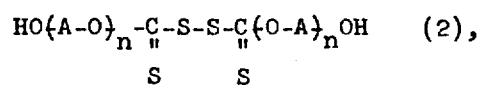

wherein A and $n$ have the above-defined meaning.

The xanthogen disulfides (2) useful in the present invention are made by reaction of a suitable diol with carbon disulfide followed by oxidation of the resulting xanthates, for example, with ammonium persulfate. Suitable diols include, for example, ethylene glycol, propylene glycol, diethylene glycol, methylene glycol, tetraethylene glycol, 1,4-butanediol, 1,3-butanediol, 2,5-hexanediol, 1,4-cyclohexanediol and 1,2-dodecanediol. The reaction of carbon disulfide with a diol is carried out in the presence of sodium hydroxide at low temperatures, about 10°–15°C. The oxidation step also is conducted below about 15°C. While no diluent is necessary for lower diols, it is practical to dilute the reaction mixture with water when a higher diol such as 1,6-hexanediol is used. Otherwise, the reaction mixture may solidify at the lower temperature.

The reaction product is usually recovered by extraction with a suitable solvent, for example, methylene chloride, and evaporation of the solvent. It is heated at 0°–10°C to minimize decomposition. Yields are in most cases in the range of 75–95%.

Polymerization of chloroprene in the presence of the xanthogen disulfides having formula (2) can be carried out in bulk chloroprene or in solution in a solvent such as ethylene dichloride or in aqueous suspension or in emulsion. The reaction is preferably carried out below 50°C to minimize undesirable side reactions, which could lead to branching or unreactive end groups. Practical rates of polymerization can be maintained above 10°C, while a convenient upper temperature limit will be about 25°C.

The xanthogen disulfide will normally be present in the polymerization medium at a concentration of about 0.03 to 5.0 mole percent based on the total monomers. Lower concentrations, for example 0.03–0.3 mole percent, would normally lead to solid polymers; between 2.5 and 5 mole percent, fluid polymers are obtained.

Between 0.3 and 2.5 mole percent, the polymer products change from soft solids to viscous fluids as the concentration is increased over this range. These xanthogen disulfides will function as chain transfer agents both in the process of this invention and in any conventional free radical initiated polymerization.

In addition to chloroprene homopolymers, copolymers of chloroprene containing up to about 50 weight percent of other copolymerizable monomers are within the scope of this invention. Therefore, the term "chloroprene polymer" will be construed to include both such homopolymers and copolymers. Representative comonomers which can be copolymerized with chloroprene include, for example, methyl or ethyl acrylate and methacrylate, acrylonitrile, styrene, vinyl acetate, butadiene, isoprene and 2,3-dichloro-1,4-butadiene. It is often desirable to incorporate about 10 weight percent of 2,3-dichloro-1,4-butadiene in liquid chloroprene polymers to impart freeze resistance.

The hydroxyl-terminated chloroprene polymers of the present invention are readily curable at ambient temperature with polyfunctional isocyanates, such as, for example, 2,4-and/or 2,6-diisocyanatomethylbenzene and 4,4'-diisocyanatodiphenylmethane. Other polyfunctional compounds which react with hydroxyl groups include, for example, polyfunctional acid chlorides such as terephthaloyl chloride and polyfunctional carbodiimides.

These novel polymers thus are useful in two-part adhesives or caulking compounds utilizing curing agents. They also are useful in the preparation of polyurethane foams, where they would replace all or part of the conventional polyols in the formulation. For these applications, liquid hydroxyl-terminated chloroprene polymers are usually more desirable than the solid polymers.

This invention is now illustrated by representative examples of certain preferred embodiments thereof, where all proportions, parts and percentages are by weight unless otherwise indicated.

EXAMPLE 1

Photopolymerization of 2-chlorobutadiene and 2,3-dichlorobutadiene in aqueous suspension in the presence of 4-hydroxybutyl xanthogen disulfide.

A. Preparation of 4-hydroxybutyl xanthogen disulfide

To a mixture of 360 g of 1,4-butanediol and 30 g of carbon disulfide, placed in a 20-round bottomed flask, was added with stirring at 5°–10°C over a period of about 1 hour a sodium hydroxide solution obtained by dissolving 6.5 g of sodium hydroxide in 25 ml of water. Subsequently, the solution was continuously stirred for 2 hours at room temperature. After diluting the mixture with 200 ml of water, 51 g of ammonium persulfate dissolved in 80 ml of water was added in about 30 minutes, maintaining the temperature at about 17°C. After adding about 500 ml of water, the organic layer was extracted with methylene chloride, dried over sodium sulfate and freed from the solvent, to give 60.2 g of yellow, viscous oil. Since the crude product still contained 13% volatiles on vacuum desiccation, the overall yield was 80% based on the weight of carbon disulfide charged. The product was filtered and stored in a refrigerator. The infrared spectrum showed the presence of both OH and xanthate groups.

B. Polymerization

A stirred mixture of 90 g of chloroprene, 10 g of 2,3-dichlorobutadiene, 13.6 g of 4-hydroxybutyl xanthogen disulfide, and 500 ml of water was irradiated for 7 hours at 19°–26°C using a GE H85-A3 mercury lamp (main emission at ≈360 nm). The monomer layer, which was initially lighter than water, was converted to a fluid polymer heavier than water. The organic product was collected by extraction with methylene chloride, which yielded 52.5 g of yellow viscous fluid on removal of the solvent. The monomer conversion was 39%. In order to obtain analytical samples, the product was purified by precipitating from benzene solution with methanol. Forty-one grams of the purified product was stabilized with 0.1 g of an antioxidant. Number average molecular weight, $\overline{M}_n$ (by vapor phase osmometry, VPO), 6,400; S, 2.8%; Cl, 40.4%; O, 1.42%; $\eta$ = 0.13. Infrared spectroscopy showed the presence of 4-hydroxybutyl xanthate ester end groups as well as the C=C band due to polychloroprene. A sufficiently satisfactory bifunctionality was demonstrated by a dissocyanate chain extension of the fluid product into a snappy solid rubber as described in Example 4.

EXAMPLE 2

Photopolymerization of chloroprene in aqueous emulsion in the presence of 4-hydroxybutyl xanthogen disulfide Chloroprene was photopolymerized in a manner similar to that of Example 1 except that irradiation was carried out in aqueous emulsion. The emulsion consisted of a solution of 50 g of 4-hydroxybutyl xanthogen disulfide in 300 g of chloroprene dispersed in a solution of 10 g of Ultrawet 60L in 330 ml of water. Dispersion was formed by mixing the chloroprene and water solutions together with high speed agitation. After 13 hours' irradiation at 16°–23°C, the product was isolated by breaking the latex with a methanol-calcium chloride-water solution. A viscous fluid polymer (85.4 g) was obtained. On standing, the fluid sample hardened due to crystallization. $\overline{M}_n$ (VPO) = 3,830; S, 4.4%; O, 2.02%; $\eta$ = 0.15.

EXAMPLE 3

Photopolymerization of chloroprene and 2,3-dichlorobutadiene with 4-hydroxybutyl xanthogen disulfide in solution Chloroprene (340 g) and 60 g of 2,3-dichlorobutadiene were photopolymerized at 15—28°C in a solution containing 360 ml of ethylene dichloride and 68 g of 4-hydroxybutyl xanthogen disulfide in a manner similar to that of Example 1. After 21 hours' irradiation and removal of the solvent, 354.1 g of brown-colored fluid polymer was obtained. After purification with methanol as described in Example 1, the liquid sample was analyzed. $\overline{M}_n$ (VPO) = 3,400; S, 3.9%; O, 1.86%; $\eta$ = 0.11; Cl, 39.5%.

EXAMPLE 4

Curing with a diisocyanatomethylbenzene

Two-gram portions of the fluid 4-hydroxybutyl xanthate ester-terminated chloroprene polymer obtained in Example 1 were treated with increasing proportions of Hylene T Organic Isocyanate (Du Pont's mixture of 2,4- and 2,6-tolylenediisocyanate) in the presence of a tin catalyst, T-12 (Metal and Thermit Corporation). The stocks of the Hylene T/chloroprene polymer ratios of 0.04–0.07/2.0 gave a snappy rubbery product after standing several days at room temperature. The final η values measures in benzene or chloroform (98–100% soluble) were 0.52–0.62 in contrast to the original value of 0.13 for the starting fluid xanthate ester-terminated polymer. One slab sample prepared at the Hylene T/Fluid ratio of 0.07/2.0 showed a tensile strength of 900 lb/in².

EXAMPLE 5

Preparation of foams

Forty-five grams of the fluid copolymer prepared in Example 3 was used to prepare a foam by reaction with 22 g of Hylene T, 5 drops of T-12, 0.5 g of 1,6-hexanediol, 0.5 g of "Quadrol"[N,N,N',N'-tetrakis(2-hydroxypropyl)ethylenediamine] (BASF Wyandotte Corporation), 1 g of "L-520" silicone fluid (Union Carbide Corporation), 1 g of "EPON" 828, and 1.8 ml of 5% aqueous solution of "Dabco". The density of the foam was 2.43 lb/ft³. The load-bearing capacity of the foam at 50% deflection was 0.44 lb/in².

EXAMPLE 6

Photopolymerization of 2-chlorobutadiene and 2,3-dichlorobutadiene in aqueous suspension in the presence of 2-(2-hydroxyethoxy)-ethyl xanthogen disulfide.

A. Preparation of 2-(2-hydroxyethoxy)-ethyl xanthogen disulfide

Using the procedure of Example 1A, the xanthate was prepared from 800 g of diethylene glycol, 191 g of carbon disulfide, and 100 g of sodium hydroxide and oxidized to the disulfide with 312 g of ammonium persulfate. The product was extracted into 400 ml of methylene chloride and the excess diol removed by washing three times with 1 liter of water, where each washing involved stirring continuously for 5 min. The methylene chloride solution was dried with magnesium sulfate and the solvent removed under vacuum to give 374 g of a clear amber oil, an 82% yield based on carbon disulfide. Sulfur analysis: found, 35.9%; expected, 35.4%. The infrared spectrum showed the presence of both OH and xanthate groups.

B. Polymerization

A solution of 191 g of chloroprene, 47 g of 2,3-dichlorobutadiene, and 29 g of 2-hydroxyethoxy)-ethyl xanthogen disulfide in 200 ml of methanol was stirred under N₂ in a "Pyrex" vessel while being irradiated for 7.8 hours in a Rayonet Model RPR 100 Photochemical Reactor, Southern New England Ultraviolet Company, Middletown, Ct., with the light from 16 8-watt lamps emitting principally at 300 nm. The polymer was not soluble in the reaction medium and precipitated as it formed. After decanting the solvent and washing the precipitated product with methanol, it was dissolved in 150 ml of methylene chloride and dried with magnesium sulfate. Removing the solvent gave 52 g of a clear, pale yellow, fluid polymer. $M_n$ (VPO) = 6830; S, 1.8%, monomer conversion 21%.

EXAMPLE 7

Photopolymerization of 2-chlorobutadiene and 2,3-dichlorobutadiene in aqueous suspension in the presence of 2-hydroxy-1-propyl xanthogen disulfide A. Preparation of 2-hydroxy-1-propyl xanthogen disulfide By the procedure of Example 6A, the xanthate was prepared from 468 g of 1,2-propanediol, 234 g of carbon disulfide and 123 g of sodium hydroxide and oxidized to the disulfide with 380 g of ammonium persulfate. The isolated product was 325 g of a clear yellow oil, 70% yield based on carbon disulfide. Sulfur analysis: found 42.9%; expected, 42.4%. The product was stored in a freezer. The infrared spectrum showed the presence of both OH and xanthate groups.

B. Polymerization

Chloroprene (477 g) and 62 g of 2,3-dichlorobutadiene were photopolymerized at 21°–41°C in a solution containing 250 ml of ethylene dichloride and 61 g of 2-hydroxy-1-propyl xanthogen disulfide in the manner described in Example 1. After 10 hours of irradiation, the conversion of monomers was 56%. Removal of solvent and unreacted monomers and purification with methanol as in Example 1 gave 269 g of a fluid polymer. $M_n$ (VPO) = 3630; S, 3.3%; Brookfield viscosities, 2.5 × 10⁵ cps; Cl, 39.0%.

EXAMPLE 8

Photopolymerization of 2-chlorobutadiene and 2,3-dichlorobutadiene in aqueous suspension in the presence of 6-hydroxy-1-hexyl xanthogen disulfide A. Preparation of 6-hydroxy-1-hexyl xanthogen disulfide The procedure of Example 6A was used to prepare the xanthate from a mixture of 200 ml of water and 460 g of 1,6-hexane diol, 81.5 g of CS₂, and 42.6 g of sodium hydroxide and to oxidize the xanthate to the disulfide with 133 g of ammonium persulfate. A clear yellow oil weighing 151 g and representing a yield of 73% was obtained. Analysis; found, 33.1% S; expected 33.2% S. The infrared spectrum showed the presence of both OH and xanthate groups.

B. Polymerization

Chloroprene (600 g), 93 g of 2,3-dichlorobutadiene, and 78 g of 6-hydroxy-1-hexyl xanthogen disulfide were irradiated for 7 hours at 21°–37°C as described in Example 1, which gave 46% conversion of the monomers. Removal of unreacted monomers and purification with methanol as in Example 1 gave 352 g of a yellow fluid polymer. $M_n$ (VPO) = 5190; S, 1.9%.

The trade names used in the above Examples have the following meaning:

Dabco, Air Products and Chemicals
triethylenediamine
Epon 828 Resin, Shell Chemical Company
2,2-bis(p-glycidoxyphenyl) propane
Silicone Surfactant L-520, Union Carbide
a water-soluble block copolymer of a silicone and polyether
T-12, Metal & Thermit Corporation
dibutyltin dilaurate
Ultrawet 60L Surfactant, ARCO Chemical Company
triethanolammonium dodecylbenzenesulfonate.

I claim:

1. A substantially linear polymer of chloroprene containing 0–50 weight percent of at least one copolymerizable monomer, said polymer being terminated substantially at each end of the chain by a xanthate group having the following formula

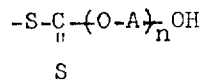

wherein A is an alkanediyl or cycloalkanediyl radical having at least two carbon atoms, and n is a positive integer of 1–4; with the proviso that the two valences of A are attached to different carbon atoms, only one of which can be a tertiary carbon atom.

2. A polymer of claim 1 wherein n is 1 and the radical A has at most 12 carbon atoms.

3. A polymer of claim 1 wherein n is 2–4, and the radical A has at most 4 carbon atoms.

4. A polymer of claim 2 wherein A is 1,4-butanediyl, 1,2-ethanediyl, 1,6hexanediyl or 1,2-propanediyl.

5. A process for preparing a polymer of chloroprene containing 0–50 weight percent of at least one copolymerizable monomer, said polymer being terminated substantially at each end of the chain by a xanthate group having the following formula

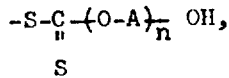

wherein A is an alkanediyl or cycloalkanediyl radical having at least two carbon atoms, and n is a positive integer of 1–4;

with the proviso that the two valences of A are attached to different carbon atoms, only one of which can be a tertiary carbon atom;

said process comprising initiating the polymerization of chloroprene or a mixture of chloroprene with up to its weight of at least one copolymerizable monomer by ultraviolet light; while having present in the polymerization medium 0.03–5.0 mole percent, based on total monomers, of a xanthogen disulfide having the following formula

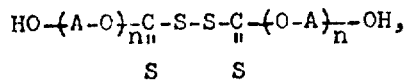

wherein A and n have the above-defined meanings; and carrying out the polymerization at about 10°–50°C.

6. The process of claim 4 wherein the proportion of the xanthogen disulfide is 2.5–5 mole percent based on total monomers.

7. A polyurethane in which the polyol component is a chloroprene polymer of claim 1.

* * * * *